(12) United States Patent
Chen et al.

(10) Patent No.: US 11,785,214 B2
(45) Date of Patent: Oct. 10, 2023

(54) SPECIFYING VIDEO PICTURE INFORMATION

(71) Applicant: MediaTek Singapore Pte. Ltd., Singapore (SG)

(72) Inventors: Lulin Chen, San Jose, CA (US); Chun-Chia Chen, Hsinchu (TW); Chih-Wei Hsu, Hsinchu (TW); Ching-Yeh Chen, Hsinchu (TW); Chen-Yen Lai, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 22 days.

(21) Appl. No.: 17/096,329

(22) Filed: Nov. 12, 2020

(65) Prior Publication Data
US 2021/0152826 A1 May 20, 2021

Related U.S. Application Data

(60) Provisional application No. 62/943,832, filed on Dec. 5, 2019, provisional application No. 62/940,333, filed on Nov. 26, 2019, provisional application No. 62/935,115, filed on Nov. 14, 2019.

(51) Int. Cl.
| | | |
|---|---|---|
| *H04N 11/02* | (2006.01) | |
| *H04N 19/119* | (2014.01) | |
| *H04N 19/176* | (2014.01) | |
| *H04N 19/169* | (2014.01) | |
| *H04N 19/46* | (2014.01) | |

(52) U.S. Cl.
CPC ......... *H04N 19/119* (2014.11); *H04N 19/176* (2014.11); *H04N 19/188* (2014.11); *H04N 19/46* (2014.11)

(58) Field of Classification Search
CPC .................................................... H04N 19/119
USPC .............................................. 375/240.01–29
See application file for complete search history.

(56) References Cited

U.S. PATENT DOCUMENTS

| | | | |
|---|---|---|---|
| 2013/0089134 A1* | 4/2013 | Wang | H04N 19/423 375/E7.026 |
| 2013/0089152 A1* | 4/2013 | Wang | H04N 19/187 375/240.23 |
| 2015/0023406 A1* | 1/2015 | Lee | H04N 19/13 375/240.02 |
| 2015/0146780 A1* | 5/2015 | Miyoshi | H04N 19/176 375/240.12 |
| 2019/0082178 A1* | 3/2019 | Kim | H04N 19/436 |
| 2019/0158825 A1* | 5/2019 | Ma | H04N 19/597 |
| 2019/0158837 A1* | 5/2019 | Zhang | H04N 19/13 |
| 2019/0394485 A1* | 12/2019 | Tsai | H04N 19/436 |
| 2020/0177922 A1* | 6/2020 | Chujoh | H04N 19/172 |

* cited by examiner

*Primary Examiner* — Leron Beck
(74) *Attorney, Agent, or Firm* — Han IP PLLC; Andy M. Han

(57) ABSTRACT

A method for specifying layout of subpictures is provided. A video decoder receives data from a bitstream to be decoded as a current picture of a video. The video decoder parses the bitstream for positions and sizes of multiple subpictures of the current picture. A position of a first subpicture and a size of a last subpicture are skipped during the parsing. The video decoder reconstructs the current picture and the subpictures of the current picture according to the positions and the sizes of the subpictures.

16 Claims, 8 Drawing Sheets

SPECIFYING VIDEO PICTURE INFORMATION

CROSS REFERENCE TO RELATED PATENT APPLICATION(S)

The present disclosure is part of a non-provisional application that claims the priority benefit of U.S. Provisional Patent Application No. 62/935,115, No. 62/940,333, and No. 62/943,832, filed on 14 Nov. 2019, 26 Nov. 2019, and 5 Dec. 2019, respectively. Contents of above-listed applications are herein incorporated by reference.

TECHNICAL FIELD

The present disclosure relates generally to video coding. In particular, the present disclosure relates to methods of specifying subpicture layout, slice structure, and picture identification.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for specifying layout of subpictures. A video decoder receives data from a bitstream to be decoded as a current picture of a video. The decoder parses the bitstream for positions and sizes of multiple subpictures, and the position of a first subpicture and the size of a last subpicture are skipped during the parsing. The video decoder reconstructs the current picture and the subpictures of the current picture according to the positions and sizes of the plurality of subpictures.

If multiple subpicture are coded in the current picture, the decoder receives a specification for a size of a first subpicture of the current picture in the bitstream. The position of the first subpicture, the position and the size of a last subpicture of the current picture are not specified in the bitstream. The decoder may receive a specification for the size and the position of a second subpicture that is not the last picture. The decoder infers the position of the first subpicture. The decoder also infers the position and the size of the last subpicture.

If only one subpicture (or no subpicture) is coded in the current picture, the decoder infers a position and a size of the only subpicture of the current picture. The position and the size of the only subpicture in the current picture are not specified in the bitstream.

In some embodiments, the decoder receives a picture order count of the current picture in a picture header of the current picture from the bitstream. In some embodiments, the picture order count is signaled in the bitstream when the picture header for the current picture is repeated in the bitstream. The picture order count in these instances can be used as an identifier that associates the repeated picture headers with the current picture.

In some embodiments, when the current picture is allowed to be partitioned into multiple non-tile based raster scan slices, the decoder receives from the bitstream an indication whether multiple slices are coded in the current picture. In some embodiments, when the current picture is partitioned into multiple non-tile based raster scan slices and multiple slices are coded in the current picture, the decoder receives a specification of a number of CTUs in a slice from the bitstream in a slice header.

In some embodiments, when the current picture is partitioned into non-rectangular slices (or raster scan slices), the decoder receives a specification of whether multiple slices are coded in a tile from the bitstream. In some embodiments, when the current picture is partitioned into non-rectangular slices and when multiple slices are coded in a tile, the decoder receives a specification of a number of CTUs in a slice from the bitstream.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
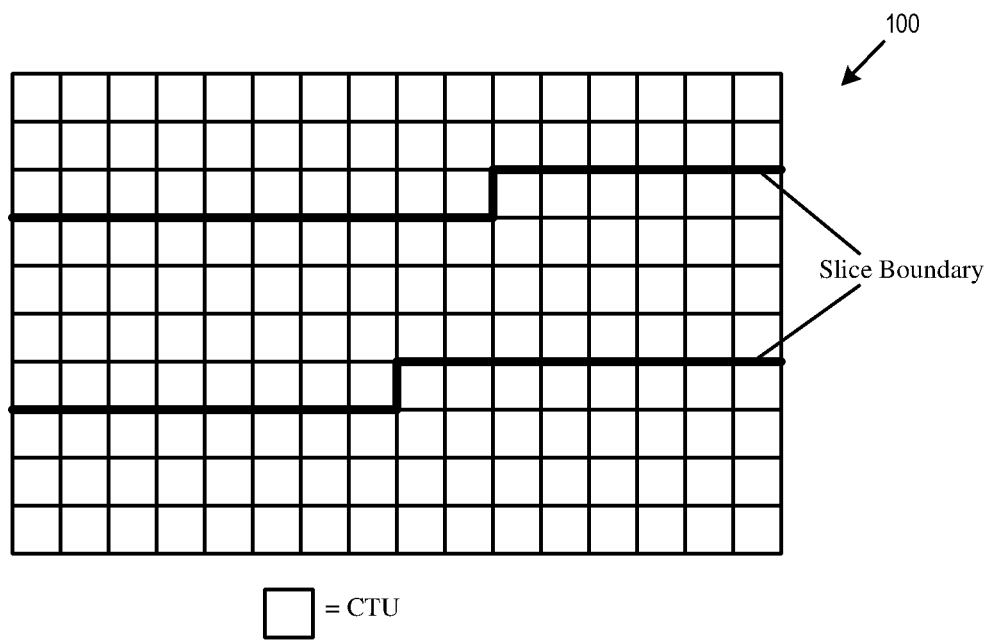
FIG. 1 illustrates slices in a video picture having only one tile or no tile partition.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Signaling Subpicture and Slice Layout

A subpicture is a secondary or subsidiary picture or frame of a main video picture. The subpicture that may display images, video, texts, or other types of data that are separately coded from the video data of the main video picture. Multiple subpictures may be associated with a video picture, and the associated subpictures are positioned within the picture according to a layout. The subpicture layout may be specified in a sequence parameter set (SPS) of a sequence that includes the video picture. Table 1 below is an example syntax table for SPS that includes specification for subpicture layout.

TABLE 1

| SPS with specification for subpicture layout | |
|---|---|
| | Descriptor |
| seq_parameter_set_rbsp( ) { | |
|     sps_decoding_parameter_set_id | u(4) |
|     sps_video_parameter_set_id | u(4) |
|     sps_max_sublayers_minus1 | u(3) |
|     sps_reserved_zero_4bits | u(4) |
|     sps_ptl_dpb_hrd_params_present_flag | u(1) |
|     if( sps_ptl_dpb_hrd_params_present_flag ) | |
|         profile_tier_level( 1, sps_max_sublayers_minus1 ) | |
|     gdr_enabled_flag | u(1) |
|     sps_seq_parameter_set_id | u(4) |
|     chroma_format_idc | u(2) |
|     if( chroma_format_idc = = 3 ) | |
|         separate_colour_plane_flag | u(1) |
|     ref_pic_resampling_enabled_flag | u(1) |
|     pic_width_max_in_luma_samples | ue(v) |
|     pic_height_max_in_luma_samples | ue(v) |
|     sps_log2_ctu_size_minus5 | u(2) |
|     subpics_present_flag | u(1) |
|     if( subpics_present_flag ) { | |
|         sps_num_subpics_minus1 | u(8) |
|         for( i = 0; i <= sps_num_subpics_minus1; i++ ) { | |
|             subpic_ctu_top_left_x[ i ] | u(v) |
|             subpic_ctu_top_left_y[ i ] | u(v) |
|             subpic_width_minus1[ i ] | u(v) |
|             subpic_height_minus1[ i ] | u(v) |

TABLE 1-continued

SPS with specification for subpicture layout

| | Descriptor |
|---|---|
|         subpic_treated_as_pic_flag[ i ] | u(1) |
|         loop_filter_across_subpic_enabled_flag[ i ] | u(1) |
|       } | |
|   } | |
|   sps_subpic_id_present_flag | u(1) |
|   if( sps_subpics_id_present_flag ) { | |
|     sps_subpic_id_signalling_present_flag | u(l) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
| ... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

In some embodiments, slice layout information of a video picture is signaled in a picture parameter set (PPS) of the video picture. A video picture in a slice-in-tile case is a video picture in which tiles are partitioned into slices. In some embodiments, for rectangular slices in the slice-in-tile picture, the layout of the slices is also specified in the PPS of the picture. When the slice size is equal to the tile size, only the slice height in units of CTU is signaled since the width is the tile width. Table 2 below is an example syntax table for PPS that includes tile and slice syntax structure, for both uniform and non-uniform tile columns and rows for the slice layout specification.

TABLE 2

PPS that includes tile and slice syntax structure

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
| ... | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|           slice_height_in_tiles_minus1[ i ] = = 0 ) { | |
|           num_slices_in_tile_minus1[ i ] | ue(v) |
|           numSlicesInTileMinus1 = num_slices_in_tile_minus1[ i ] | |

TABLE 2-continued

PPS that includes tile and slice syntax structure

| | Descriptor |
|---|---|
|         for( j = 0; j < numSlicesInTileMinus1; j++ ) | |
|            slice_height_in_ctu_minus1[ i++ ] | ue(v) |
|         } | |
|         if(         tile_idx_delta_present_flag && i < num_slices_in_pic_minus1 ) | |
|            tile_idx_delta[ i ] | se(v) |
|     } | |
|     loop_filter_across_tiles_enabled_flag | u(1) |
|     loop_filter_across_slices_enabled_flag | u(1) |
| } | |
|   entropy_coding_sync_enabled_flag | u(1) |
| ... | |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

Some embodiments of the disclosure provide a method to improve the signaling for the subpicture layout in the SPS at a video coder (encoder or decoder). In some embodiments, for signaling the subpicture layout in the SPS, the video coder may infer the size information when there is only one subpicture in the picture. When no subpicture is signaled or where there is only one subpicture within a picture, the picture is the subpicture with known position and size information. In some embodiments, the video coder may infer the top-left position for the first subpicture and infer the last subpicture position when there are more than one subpicture in the picture. The top-left position for the first subpicture is [0, 0] and the last subpicture is the right and bottom area of the picture. Table 3 shows modified SPS syntax for specifying subpicture layout.

TABLE 3

Modified SPS syntax for specifying subpicture layout

| | |
|---|---|
| Subpics_present_flag | u(1) |
| if( subpics_present_flag ) { | |
|   sps_num_subpics_minus1 | u(8) |
| if( sps_num_subpics_minus1 ) { | |
|     for( i = 0; i <= sps_num_subpics_minus1; i++ ) { | |
|       if (i < sps_num_subpics_minus1) { | |
|         if( i > 0 ) { | |
|           subpic_ctu_top_left_x[ i ] | u(v) |
|           subpic_ctu_top_left_y[ i ] | u(v) |
|         } | |
|         subpic_width_minus1[ i ] | u(v) |
|         subpic_height_minus1[ i ] | u(v) |
|       } | |
|       subpic_treated_as_pic_flag[ i ] | u(1) |
|       loop_filter_across_subpic_enabled_flag[ i ] | u(1) |
|     } | |
|   } | |
| } | |
| sps_subpic_id_present_flag | u(1) |
| if( sps_subpics_id_present_flag ) { | |
|   sps_subpic_id_signalling_present_flag | u(1) |
| if( sps_subpics_id_signalling_present_flag ) { | |
|     sps_subpic_id_len_minus1 | ue(v) |
|     for( i = 0; i <= sps_num_subpics_minus1; i++ ) | |
|       sps_subpic_id[ i ] | u(v) |
|   } | |
| } | |
| ... | |

In other words, when two or more subpictures are coded in the current picture, a size (e.g., width indicated by subpic_width_minus1 or height indicated by subpic_height_minus1) of the first subpicture (i=0) of the current picture are specified in the bitstream, but a position (e.g., top-left position indicated by subpic_ctu_top_left) of the first subpicture, a position and a size of the last subpicture (i=sps_num_subpics_minus1) are not specified in the bitstream. As for each subpicture other than the first and last subpicture (e.g., the second subpicture), both size and position of the subpicture are specified in the bitstream. In some embodiments, the position of the first subpicture, the position and the size of the last subpicture of the current picture are inferred by the video encoder or decoder and not signaled in the bitstream. When there is only one subpicture in the current picture, a position and a size of the only subpicture of the current picture are inferred by the video encoder or decoder and not signaled in the bitstream.

II. Signaling Raster Scan Slice and Tile Layout

Slices may be tile-based or non-tile based. Non-tile slices are slices in a picture that is not partitioned into tiles or, such that the slices are not bound by tile boundaries. Tile slices are slices in a picture that is partitioned into tiles such that the slices are bound by tile boundaries. A raster scan slice is a slice defined by a sequence of CTUs in raster scan order, and therefore may not be rectangular.

For tile-based raster scan slices, tile partitioning is used as an intermediate data grouping layer for specifying slices. However, some coding tools may not be allowed across tile partition boundaries (e.g., spatial merge mode, affine merge mode, intra-prediction, etc.), such that the coding efficiency to some extent may be decreased. It may be advantageous for some applications to use a reasonable number of tile partitions or no tile partitions.

In some embodiments, tile partitioning for the raster scan slice is optional while the slice partition is specified in units of CTU. In some embodiments, a syntax element no_pic_partition_flag being equal to 1 specifies that no picture partitioning is applied to each picture referring to the PPS. This may imply that there is only a single tile or there is no tile partitioning in the picture. The tile partition parameters, though not present, may be inferred based on a set of inference rules. This is referred to as the slice-in-picture case. In some embodiments, in the slice-in-picture case, the slice is specified in units of CTUs based on raster scan.

FIG. 1 illustrates slices in a video picture 100 having only one tile or no tile partition, or the slice-in-picture case. The video picture 100 can be regarded as having only one tile or no tile partitioning at all, and the slices within are non-tile based slices. As illustrated, the layout of the slices are limited by boundaries of the picture and not of any tiles, such that the slices are considered to be partitions of a picture rather than partitions of a tile. The slice in the video picture 100 are specified in units of CTUs in raster scan.

In some embodiments, when the current picture is partitioned into multiple non-tile based raster scan slices (or non-rectangular slices), whether multiple slices are coded in the current picture (slice-in-picture case) is specified in the bitstream. When the current picture is partitioned into multiple non-tile based raster scan slices and multiple slices are coded in the current picture, the size of a slice is specified in terms of CTUs. Specifically, the number of CTUs in a slice is specified in the bitstream. Tables 4A and 4B respectively show a PPS and a slice header for the slice-in-picture case.

TABLE 4A

| PPS for slice-in-picture case | |
|---|---|
| | Descriptor |
| Pic_parameter_set_rbsp( ) { | |
|     pps_pic_parameter_set_id | ue(v) |
|     ... | |
|     output_flag_present_flag | u(1) |
|     mixed_nalu_types_in_pic_flag | u(1) |
|     pps_subpic_id_signalling_present_flag | u(1) |
|     if( pps_subpics_id_signalling_present_flag ) { | |
|         pps_num_subpics_minus1 | ue(v) |
|         pps_subpic_id_len_minus1 | ue(v) |
|         for( i = 0; i <= pps_num_subpic_minus1; i++ ) | |
|             pps_subpic_id[ i ] | u(v) |
|     } | |
|     no_pic_partition_flag | u(1) |
|     if( !no_pic_partition_flag ) { | |
|         pps_log2_ctu_size_minus5 | u(2) |
|         num_exp_tile_columns_minus1 | ue(v) |
|         num_exp_tile_rows_minus1 | ue(v) |
|         for( i = 0; i <= num_exp_tile_columns_minus1; i++ ) | |
|             tile_column_width_minus1[ i ] | ue(v) |
|         for( i = 0; i <= num_exp_tile_rows_minus1; i++ ) | |
|             tile_row_height_minus1[ i ] | ue(v) |
|         rect_slice_flag | u(1) |
|         if( rect_slice_flag ) | |
|             single_slice_per_subpic_flag | u(1) |
|         if( rect_slice_flag && !single_slice_per_subpic_flag ) { | |
|             num_slices_in_pic_minus1 | ue(v) |
|             tile_idx_delta_present_flag | u(1) |
|             for( i = 0; i < num_slices_in_pic_minus1; i++ ) { | |
|                 slice_width_in_tiles_minus1[ i ] | ue(v) |
|                 slice_height_in_tiles_minus1[ i ] | ue(v) |
|                 if( slice_width_in_tiles_minus1[ i ] = = 0 && | |
|                     slice_height_in_tiles_minus1[ i ] = = 0 ) { | |
|                     num_slices_in_tile_minus1[ i ] | ue(v) |
|                     numSlicesInTileMinus1 = num_slices_in_tile_minus1[ i ] | |
|                     for( j = 0; j < numSlicesInTileMinus1; j++ ) | |
|                         slice_height_in_ctu_minus1[ i++ ] | ue(v) |
|                 } | |
|                 if( tile_idx_delta_present_flag && i < num_slices_in_pic_minus1 ) | |
|                   tile_idx_delta[ i ] | se(v) |
|             } | |
|         } | |
|         loop_filter_across_tiles_enabled_flag | u(1) |
|         loop_filter_across_slices_enabled_flag | u(1) |
|     } | |
|     else | |
|         raster_scan_slice_in_pic_enabled_flag | u(1) |
|         if( raster_scan_slice_in_pic_enabled_flag ) | |
|             loop_filter_across_slices_enabled_flag | u(1) |
|             entropy_coding_sync_enabled_flag | u(1) |
|     ... | |

TABLE 4A-continued

PPS for slice-in-picture case

| | Descriptor |
|---|---|
| picture_header_extension_present_flag | u(1) |
| slice_header_extension_present_flag | u(1) |
| pps_extension_flag | u(1) |
| if( pps_extension_flag ) | |
|     while( more_rbsp_data( ) ) | |
|         pps_extension_data_flag | u(1) |
|     rbsp_trailing_bits( ) | |
| } | |

TABLE 4B slice header for slice-in-picture case

| | Descriptor |
|---|---|
| slice_header( ) { | |
|     slice_pic_order_cnt_lsb | u(v) |
|     if( subpics_present_flag ) | |
|         slice_subpic_id | u(v) |
|     if( raster_scan_slice_in_pic_enabled_flag \|\| !rect_slice_flag && NumTilesInPic = 1) | |
|         slices_in_pic_present_flag | u(1) |
|     if( slices_in_pic_present flag ) { | |
|         num_ctus_in_slice_minus1 | ue(v) |
|     } | |
|     else if( rect_slice_flag \|\| NumTilesInPic > 1 ) | |
|         slice_address | u(v) |
|     if( !rect_slice_flag && NumTilesInPic > 1 ) | |
|         num_tiles_in_slice_minus1 | ue(v) |
|     slice_type | ue(v) |
| ... | |
|     if( slice_header_extension_present_flag ) { | |
|         slice_header_extension_length | ue(v) |
|         for( i = 0; i < slice_header_extension_length; i++) | |
|             slice_header_extension_data_byte[ i ] | u(8) |
|     } | |
|     byte_alignment( ) | |
| } | |

The value of the syntax element subpics_present_flag being 1 specifies that one or more subpictures are present in each coded picture in the coded layer-wise video sequence (CLVS) and subpicture parameters are present in in the SPS raw byte sequence payload (RBSP) syntax. The value of subpics_present_flag being equal to 0 specifies that no subpictures are present in each coded picture in the CLVS and subpicture parameters are not present in the SPS RBSP syntax. In some embodiments, when a bitstream is the result of a sub-bitstream extraction process and the bitstream contains only a subset of the subpictures of the input bitstream to the sub-bitstream extraction process, the value of subpics_present_flag is set to 1 in the RBSP of the SPSs. When subpics_present_flag is equal to 0, each coded picture in the CLVS may be considered as a subpicture in a bitstream extraction and merging process.

The value of the syntax element sps_num_subpics_minus1 plus 1 specifies the number of subpictures. The range of sps_num_subpics_minus1 is constrained to be 0 to 254 in some embodiments. When not present, the value of sps_num_subpics_minus1 is inferred to be equal to 0. The value of sps_num_subpics_minus1 being equal to 0 indicates that each coded picture in the CLVS is the subpicture.

The value of the syntax element rect_slice_flag equal to 0 specifies that tiles or CTUs within each slice are in raster scan order and the slice information is not signalled in PPS. The value of rect_slice_flag being equal to 1 specifies that tiles or CTUs within each slice cover a rectangular region of the picture and the slice information is signaled in the PPS. When not present, rect_slice_flag is inferred to be equal to 1. When subpics_present_flag is equal to 1, the value of rect_slice_flag is inferred to be equal to 1 When raster_scan_slice_in_pic_enabled_flag is equal to 1, the value of rect_slice_flag is inferred to be equal to 0.

The value of the syntax element no_pic_partition_flag being equal to 1 specifies that tile partitioning is not applied to pictures that refer to the PPS. The value of no_pic_partition_flag being equal to 0 specifies that each picture referring to the PPS may be partitioned into more than one tile or slice.

The value of the syntax element raster_scan_slice_in_pic_enabled_flag being equal to 0 specifies that no raster scan slice partitioning is applied to each picture referring to the PPS. The value of raster_scan_slice_in_pic_enabled_flag being equal to 1 specifies that, when no_pic_partition_flag is equal to 1, each picture referring to the PPS may be partitioned into more than one raster scan slice. When not present, the value of raster_scan_slice_in_pic_enabled_flag is inferred to be equal to 0.

The value of the syntax element single_slice_per_subpic_flag being equal to 1 specifies that each subpicture includes one and only one rectangular slice. The value of single_slice_per_subpic_flag being 0 specifies that each subpicture may consist one or more rectangular slices. When single_slice_per_subpic_flag is equal to 1, num_slices_in_pic_minus1 is inferred to be equal to sps_num_subpics_minus1. When single_slice_per_subpic_flag is equal to 1 and sps_num_subpics_minus1 is equal to 0, num_slices_in_pic_minus1 is inferred to be equal to 0 (i.e. the current picture is the subpicture and includes only one rectangular slice).

The value of the syntax element slices_in_pic_present_flag being equal to 1 specifies that multiple slices are present in the current picture. The value of slices_in_pic_present_flag equal to 0 specifies no multiple slices is present in the current picture. When not present, slices_in_pic_present_flag is inferred to be equal to 0.

The value of the syntax element num_ctus_in_slice_minus1 plus 1 specifies the number of CTUs in the current slice. When slices_in_pic_present_flag is equal to 1, the value of num_ctus_in_slice_minus1 is constrained to be in the range of 0 to PicSizeInCtbsY−1, inclusive. When not present, num_ctus_in_slice_minus1 is inferred to be equal to PicSizeInCtbsY−1.

The syntax element slice_address specifies the slice address of the slice. When not present, the value of slice_address is inferred to be 0.

If slices_in_pic_present_flag is equal to 1, the following applies:
  The slice address is the first CTB in the slice, in CTB raster scan of a picture.
  The length of slice_address is Ceil(Log2 (PicSizeInCtbsY)) bits.
  The value of slice_address shall be in the range of 0 to PicSizeInCtbsY−1, inclusive, and the value of slice_address shall not be equal to the value of slice_address of any other coded slice NAL unit of the same coded picture.

Otherwise, if rect_slice_flag is equal to 0, the following applies:
  The slice address is the raster scan tile index.
  The length of slice_address is Ceil(Log2 (NumTilesInPic)) bits.
  The value of slice_address shall be in the range of 0 to NumTilesInPic−1, inclusive.

Otherwise (rect_slice_flag is equal to 1), the following applies:
  The slice address is the slice index of the slice within the SubPicIdx-th subpicture.
  The length of slice_address is Ceil(Log2(NumSlicesInSubpic[SubPicIdx])) bits.
  The value of slice_address shall be in the range of 0 to NumSlicesInSubpic[SubPicIdx]−1, inclusive.

In some embodiments, for bitstream conformance, the following constraints apply:
  If rect_slice_flag is equal to 0 or subpics_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  When rect_slice_flag is equal to 0, the slices of a picture shall be in increasing order of their slice_address values.
  The shapes of the slices of a picture shall be such that each CTU, when decoded, shall have its entire left boundary and entire top boundary consisting of a picture boundary or consisting of boundaries of previously decoded CTU(s).

The value of the syntax element num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if (slices_in_pic_present_flag)
    NumCtuInCurrSlice = num_ctus_in_slice_minus1 + 1
else if( rect_slice_flag ) {
    picLevelSliceIdx = SliceSubpicToPicIdx[ SubPicIdx ][ slice_address ]
    NumCtuInCurrSlice = NumCtuInSlice[ picLevelSliceIdx ]
    for( i = 0; i < NumCtuInCurrSlice; i++ )
        CtbAddrInCurrSlice[ i ] = CtbAddrInSlice[ picLevelSliceIdx ][ i ]
} else {
    NumCtuInCurrSlice = 0
    for( tileIdx = slice_address; tileIdx <= slice_address + num_tiles_in_slice_minus1 [ i ]; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ]; ctbY++ )
        {
            for( ctbX = tileColBd[ tileX ]; ctbX < tileColBd[ tileX + 1 ]; ctbX++ ) {
                CtbAddrInCurrSlice[ NumCtuInCurrSlice ] = ctbY * PicWidthInCtb + ctbX
                NumCtuInCurrSlice++
            }
        }
    }
}
```

In some embodiments, the slice-in-tile case for the raster scan slice is allowed, and the slice may or may not be rectangular. In some embodiments, a syntax element no_pic_partition_flag being equal to 0 specifies that each picture referring to the PPS may be partitioned into more than one tile or slice. In some embodiments, for raster scan slice-in-tile cases, each slice is specified in units of CTUs in raster scan within a tile.

Figure 2:
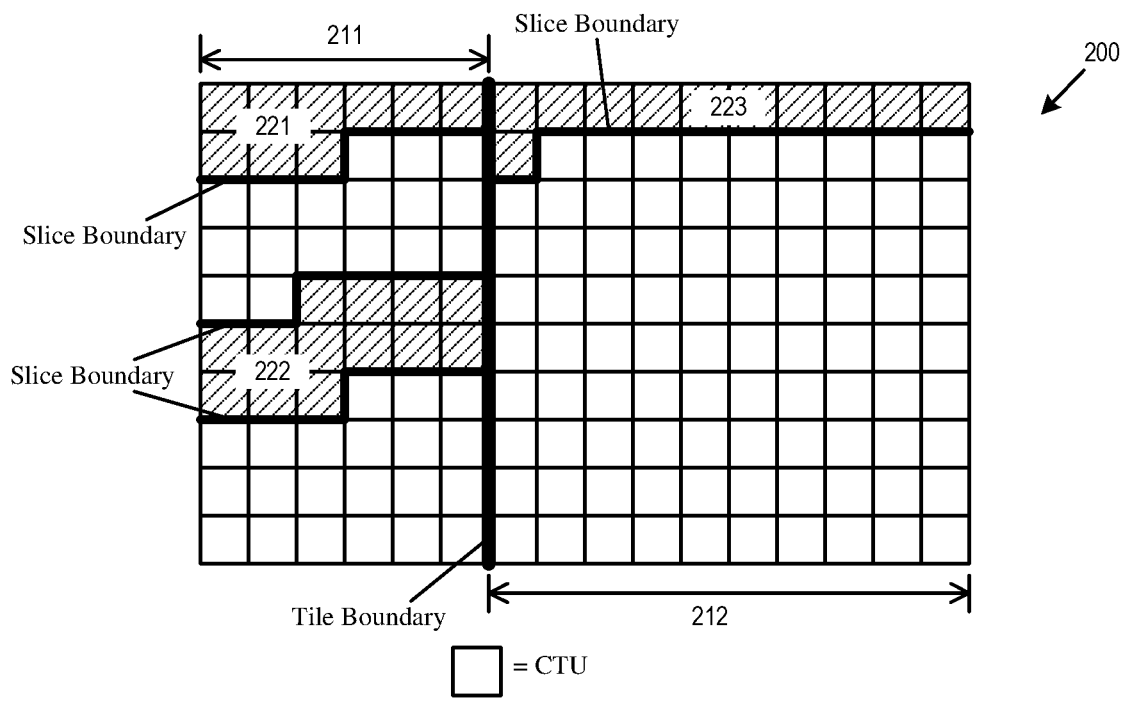
FIG. 2 illustrates slices in a video picture having slices in tiles in raster scan.

FIG. 2 illustrates slices in a video picture 200 having slices in tiles in raster scan (or raster scan slice-in-tile case.) The video picture 200 has two tiles 211 and 212 that are separated by a tile boundary. Each tile includes slices in raster scan that are limited by tile boundaries, such as non-rectangular slices 221 and 222 in tile 211, and non-rectangular slice 223 in tile 212. In some embodiments, when the current picture is partitioned into non-rectangular slices (or raster scan slices), whether multiple slices are coded in a tile is specified in the bitstream. When multiple slices are coded in a tile, the number of CTUs in a slice is specified in the bitstream. Table 5 shows slice header syntax for the raster scan slice-in-tile case.

TABLE 5

| | Descriptor |
|---|---|
| slice_header( ) { | |
|     slice_pic_order_cnt_lsb | u(v) |
|     if( subpics_present_flag ) | |
|         slice_subpic_id | u(v) |
|     if( rect_slice_flag \|\| NumTilesInPic > 1 ) | |
|         slice_address | u(v) |
|     if( !rect_slice_flag && NumTilesInPic > 1 ) { | |
|         num_tiles_in_slice_minus1 | ue(v) |
|     if( !num_tiles_in_slice_minus1 ) | |
|         slices_in_tile_present_flag | u(1) |
|     if( slices_in_tile_present_flag ) | |
|         num_ctus_in_slice_minus1 | ue(v) |
|     } | |
|     slice_type | ue(v) |
|     ... | |
|     if( slice_header_extension_present_flag ) { | |
|         slice_header_extension_length | ue(v) |
|         for( i = 0; i < slice_header_extension_length; i++) | |
|             slice_header_extension_data_byte[ i ] | u(8) |
|     } | |
|     byte_alignment( ) | |
| } | |

The value of the syntax element slices_in_tile_present_flag being equal to 1 specifies that the multiple slices are present in the tile. The value of slices_in_tile_present_flag being equal to 0 specifies that no multiple slices is present in the current tile. When not present, slices_in_tile_present_flag is inferred to be equal to 0.

The value of the syntax element num_ctus_in_slice_minus1 plus 1 specifies the number of CTUs in the current slice. When the value of slices_in_tile_present_flag is equal to 1, the value of num_ctus_in_slice_minus1 shall be in the range of 0 to TileSizeInCtbsY−1, inclusive, where TileSizeInCtbsY=RowHeight[tileY]*RowWidth[tileX], tileX is the tile column index containing the current slice, and tileY is the tile row index containing the current slice. When not present, num_ctus_in_slice_minus1 is inferred to be equal to PicSizeInCtbsY−1.

The value of the syntax element slice_address specifies the slice address of the slice. When not present, the value of slice_address is inferred to be equal to 0.

If slices_in_tile_present_flag is equal to 1, the following applies:
    The slice address is the first CTB in the slice, in CTB raster scan of a picture.
    The length of slice_address is Ceil(Log2 (TileSizeInCtbsY)) bits.
    The value of slice_address shall be in the range of 0 to TileSizeInCtbsY−1, inclusive, and the value of slice_address shall not be equal to the value of slice_address of any other coded slice NAL unit of the same coded picture.

Otherwise, if rect_slice_flag is equal to 0, the following applies:
    The slice address is the raster scan tile index.
    The length of slice_address is Ceil(Log2 (NumTilesInPic)) bits.
    The value of slice_address shall be in the range of 0 to NumTilesInPic−1, inclusive.

Otherwise (rect_slice_flag is equal to 1), the following applies:
    The slice address is the slice index of the slice within the SubPicIdx-th subpicture.
    The length of slice_address is Ceil(Log2(NumSlicesInSubpic[SubPicIdx])) bits.
    The value of slice_address shall be in the range of 0 to NumSlicesInSubpic[SubPicIdx]−1, inclusive.

In some embodiments, for bitstream conformance, the following constraints apply:
    If rect_slice_flag is equal to 0 or subpics_present_flag is equal to 0, the value of slice_address shall not be equal to the value of slice_address of any other coded slice NAL unit of the same coded picture.
    Otherwise, the pair of slice_subpic_id and slice_address values shall not be equal to the pair of slice_subpic_id and slice_address values of any other coded slice NAL unit of the same coded picture.
    When rect_slice_flag is equal to 0, the slices of a picture shall be in increasing order of their slice_address values.
    The shapes of the slices of a picture shall be such that each CTU, when decoded, shall have its entire left boundary and entire top boundary consisting of a picture boundary or consisting of boundaries of previously decoded CTU(s).

The value of the syntax element num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if( rect_slice_flag ) {
    picLevelSliceIdx = SliceSubpicToPicIdx[ SubPicIdx ][ slice_address ]
    NumCtuInCurrSlice = NumCtuInSlice[ picLevelSliceIdx ]
    for( i = 0; i < NumCtuInCurrSlice; i++ )
        CtbAddrInCurrSlice[ i ] = CtbAddrInSlice[ picLevelSliceIdx ][ i ]
} else if( slices_in_tile_present_flag )
    NumCtuInCurrSlice = num_ctus_in_slice_minus1 + 1
} else {
    NumCtuInCurrSlice = 0
    for( tileIdx = slice_address; tileIdx <=
slice_address + num_tiles_in_slice_minus1 [ i ]; tileIdx++ ) {
        tileX = tileIdx % NumTileColumns
        tileY = tileIdx / NumTileColumns
        for( ctbY = tileRowBd[ tileY ]; ctbY < tileRowBd[ tileY + 1 ]; ctbY++ )
```

```
{
        for( ctbX = tileColBd[ tileX ]; ctbX < tileColBd[ tileX + 1 ];
ctbX++ ) {
                CtbAddrInCurrSlice[ NumCtuInCurrSlice ] =
ctbY * PicWidthInCtb + ctbX
                NumCtuInCurrSlice++
            }
        }
    }
}
```

III. Signaling Picture Order Count in Picture Header

In coded video, the picture header (PH) of a picture may be used as the start of the picture. Unlike a PPS that store information common to several pictures that refers to the PPS, a picture header of a picture store information unique to the picture. The picture header of a picture may store parameters of the picture that remain the same for different slices of the picture. For example, in some embodiments, the picture order count of the picture is specified in the picture header. Picture order count of a picture may be used to encode or decode the picture, e.g., for creating interpolated or extrapolated motion vectors for merge candidates for inter prediction. The picture order count may also be used as the identifier of the picture when the picture header is repeated as a loss detection mechanism. Table 6A shows a picture header that specifies the picture order count.

TABLE 6A

| | Descriptor |
|---|---|
| picture_header_rbsp( ) { | |
|     ph_pic_order_cnt_lsb | u(v) |
|     non_reference_picture_flag | u(1) |
|     gdr_pic_flag | u(1) |
|     no_output_of_prior_pics_flag | u(1) |
|     if( gdr_pic_flag ) | |
|         recovery_poc_cnt | ue(v) |
|     ph_pic_parameter_set_id | ue(v) |
|     ... | |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

The syntax element ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4+4 bits. The value of the ph_pic_order_cnt_lsb shall be in the range of 0 to MaxPicOrderCntLsb−1, inclusive. The syntax element ph_pic_order_cnt_lsb may be used as the identifier when the PH repetition occurs. The value of ph_pic_order_cnt_lsb remain the same in all repetitive picture headers. In some embodiments, the picture header may also include a picture header repetition flag. Table 6B shows a picture header that includes a picture order count and a picture header repetition flag.

TABLE 6B

| | Descriptor |
|---|---|
| picture_header_rbsp( ) { | |
|     ph_repetition_present_flag | u(1) |
|     if( ph_repetition_present_flag ) | |
|         ph_pic_order_cnt_lsb | u(v) |
|     non_reference_picture_flag | u(1) |
|     gdr_pic_flag | u(1) |
|     no_output_of_prior_pics_flag | u(1) |
|     if( gdr_pic_flag ) | |
|         recovery_poc_cnt | ue(v) |
|     ph_pic_parameter_set_id | ue(v) |
|     ... | |
|     if( picture_header_extension_present_flag ) { | |
|         ph_extension_length | ue(v) |
|         for( i = 0; i < ph_extension_length; i++) | |
|             ph_extension_data_byte[ i ] | u(8) |
|     } | |
|     rbsp_trailing_bits( ) | |
| } | |

The value of the syntax element ph_repetition_present_flag being equal to 1 specifies that ph_pic_order_cnt_lsb is present for the coded picture associated with the PH. The picture header repetition may or may not occur for the coded picture. The value of ph_repetition_flag being equal to 0 specifies that ph_pic_order_cnt_lsb is not present.

In some embodiments, each slice header of the slices in the picture has a syntax element slice_pic_order_cnt_lsb with value equal to ph_pic_order_cnt_lsb in the PH. Table 7 shows a slice header that specifies picture order count.

TABLE 7

| | Descriptor |
|---|---|
| slice_header( ) { | |
|     slice_pic_order_cnt_lsb | u(v) |
|     if( subpics_present_flag ) | |
|         slice_subpic_id | u(v) |
|     if( rect_slice_flag \|\| NumTilesInPic > 1 ) | |
|         slice_address | u(v) |
|     if( !rect_slice_flag && NumTilesInPic > 1 ) | |
|         num_tiles_in_slice_minus1 | ue(v) |
|     slice_type | ue(v) |
|     ... | |
|     byte_alignment( ) | |
| } | |

In some embodiments, the value of the slice header syntax element slice_pic_order_cnt_lsb is the same in all slice headers of a coded picture, and that the value of slice_pic_order_cnt_lsb is equal to ph_pic_order_cnt_lsb in the PH of the picture for the slices associated with the picture or PH. In some embodiments, when the PH syntax element ph_pic_order_cnt_lsb is not present, the SH syntax element slice_pic_order_cnt_lsb specifies the picture order count modulo MaxPicOrderCntLsb for the current picture. The length of the slice_pic_order_cnt_lsb syntax element is log2_max_pic_order_cnt_lsb_minus4+4 bits. The value of the slice_pic_order_cnt_lsb shall be in the range of 0 to MaxPicOrderCntLsb−1, inclusive. When ph_pic_order_c-nt_lsb is present, slice_pic_order_cnt_lsb shall be equal to ph_pic_order_cnt_lsb for the slices associated with the PH.

In some embodiments, when the current picture is a gradual decoding refresh (GDR) picture, the variable RpPi-cOrderCntVal is derived according to RpPicOrderCntVal=PicOrderCntVal+recovery_poc_cnt.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

IV. Example Video Encoder

Figure 3:
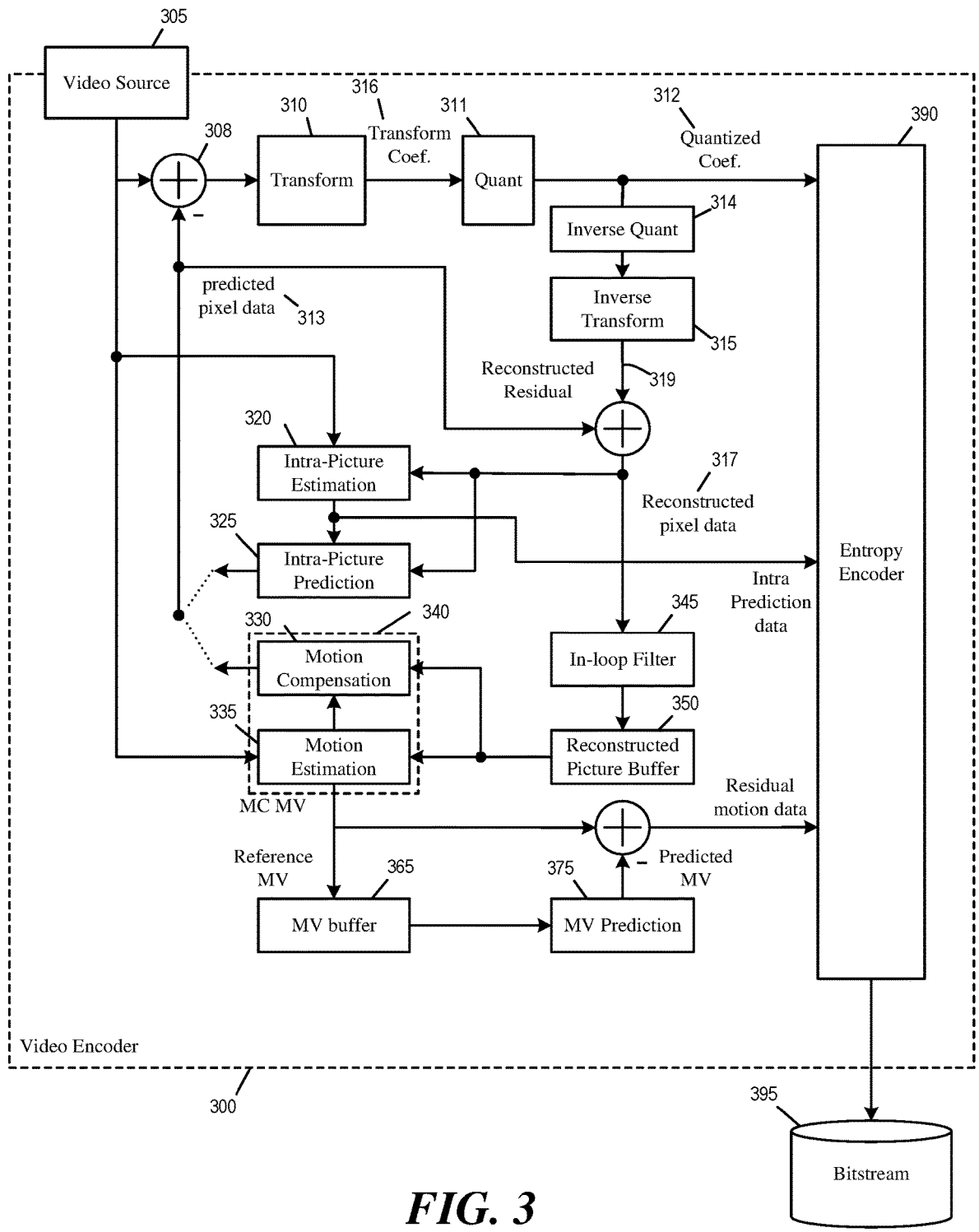
FIG. 3 illustrates an example video encoder.

FIG. 3 illustrates an example video encoder 300. As illustrated, the video encoder 300 receives input video signal from a video source 305 and encodes the signal into bitstream 395. The video encoder 300 has several components or modules for encoding the signal from the video source 305, at least including some components selected from a transform module 310, a quantization module 311, an inverse quantization module 314, an inverse transform module 315, an intra-picture estimation module 320, an intra-prediction module 325, a motion compensation module 330, a motion estimation module 335, an in-loop filter 345, a reconstructed picture buffer 350, a MV buffer 365, and a MV prediction module 375, and an entropy encoder 390. The motion compensation module 330 and the motion estimation module 335 are part of an inter-prediction module 340.

In some embodiments, the modules 310-390 are modules of software instructions being executed by one or more processing units (e.g., a processor) of a computing device or electronic apparatus. In some embodiments, the modules 310-390 are modules of hardware circuits implemented by one or more integrated circuits (ICs) of an electronic apparatus. Though the modules 310-390 are illustrated as being separate modules, some of the modules can be combined into a single module.

The video source 305 provides a raw video signal that presents pixel data of each video frame without compression. A subtractor 308 computes the difference between the raw video pixel data of the video source 305 and the predicted pixel data 313 from the motion compensation module 330 or intra-prediction module 325. The transform module 310 converts the difference (or the residual pixel data or residual signal 309) into transform coefficients (e.g., by performing Discrete Cosine Transform, or DCT). The quantization module 311 quantizes the transform coefficients into quantized data (or quantized coefficients) 312, which is encoded into the bitstream 395 by the entropy encoder 390.

The inverse quantization module 314 de-quantizes the quantized data (or quantized coefficients) 312 to obtain transform coefficients, and the inverse transform module 315 performs inverse transform on the transform coefficients to produce reconstructed residual 319. The reconstructed residual 319 is added with the predicted pixel data 313 to produce reconstructed pixel data 317. In some embodiments, the reconstructed pixel data 317 is temporarily stored in a line buffer (not illustrated) for intra-picture prediction and spatial MV prediction. The reconstructed pixels are filtered by the in-loop filter 345 and stored in the reconstructed picture buffer 350. In some embodiments, the reconstructed picture buffer 350 is a storage external to the video encoder 300. In some embodiments, the reconstructed picture buffer 350 is a storage internal to the video encoder 300.

The intra-picture estimation module 320 performs intra-prediction based on the reconstructed pixel data 317 to produce intra prediction data. The intra-prediction data is provided to the entropy encoder 390 to be encoded into bitstream 395. The intra-prediction data is also used by the intra-prediction module 325 to produce the predicted pixel data 313.

The motion estimation module 335 performs inter-prediction by producing MVs to reference pixel data of previously decoded frames stored in the reconstructed picture buffer 350. These MVs are provided to the motion compensation module 330 to produce predicted pixel data.

Instead of encoding the complete actual MVs in the bitstream, the video encoder 300 uses MV prediction to generate predicted MVs, and the difference between the MVs used for motion compensation and the predicted MVs is encoded as residual motion data and stored in the bitstream 395.

The MV prediction module 375 generates the predicted MVs based on reference MVs that were generated for encoding previously video frames, i.e., the motion compensation MVs that were used to perform motion compensation. The MV prediction module 375 retrieves reference MVs from previous video frames from the MV buffer 365. The video encoder 300 stores the MVs generated for the current video frame in the MV buffer 365 as reference MVs for generating predicted MVs.

The MV prediction module 375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 395 by the entropy encoder 390.

The entropy encoder 390 encodes various parameters and data into the bitstream 395 by using entropy-coding techniques such as context-adaptive binary arithmetic coding (CABAC) or Huffman encoding. The entropy encoder 390 encodes various header elements, flags, along with the quantized transform coefficients 312, and the residual motion data as syntax elements into the bitstream 395. The bitstream 395 is in turn stored in a storage device or transmitted to a decoder over a communications medium such as a network.

The in-loop filter 345 performs filtering or smoothing operations on the reconstructed pixel data 317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 4:
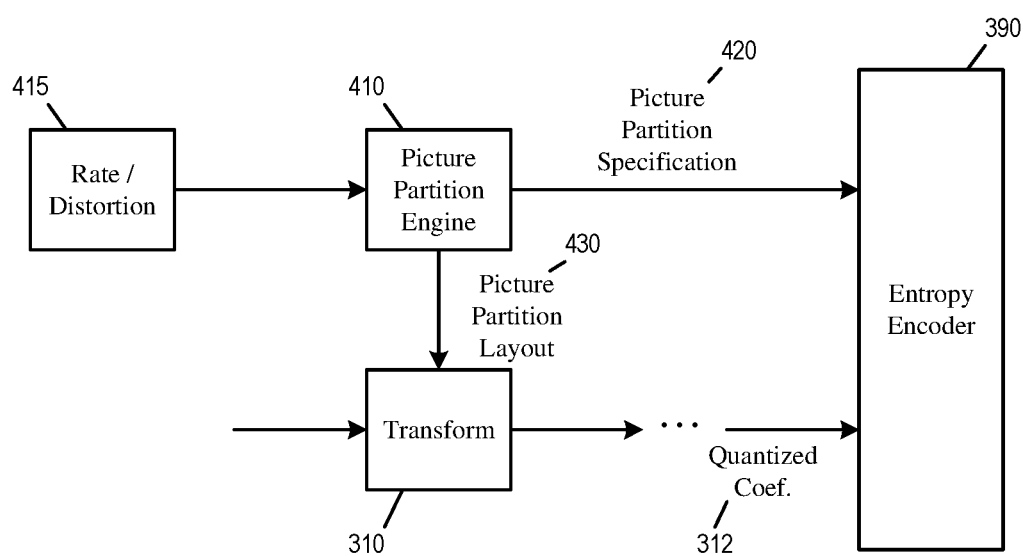
FIG. 4 illustrates portions of the video encoder that implements specification of subpicture layout, slice structure, and picture identification.

FIG. 4 illustrates portions of the video encoder 300 that implements specification of subpicture layout, slice structure, and picture identification. Specifically, a picture partition engine 410 generates a set of picture partitioning specifications 420 for the entropy encoder 390 based on a set of rate/distortion information 415. These picture partitioning specifications 420 include slice layout information, subpicture layout information, and slice layout information. The entropy encoder 390 correspondingly signals flags or parameters such as positions and sizes of subpictures, slice-in-tile or slice-in-picture indications, raster scan slice or rectangular slice indications in SPSs, PPSs, or slice headers of the bitstream 395. The entropy encoder 390 may further signal picture order counts and picture header repeat indications in picture headers in the bitstream 395. The picture partition engine 410 also provide corresponding picture partitioning layout 430 to the transform module 310, intra-picture estimation module 320, Intra-picture prediction module 325, inter-prediction module 340, etc., so these modules may encode the current picture according to the subpicture, tile, and slice layout.

Figure 5:
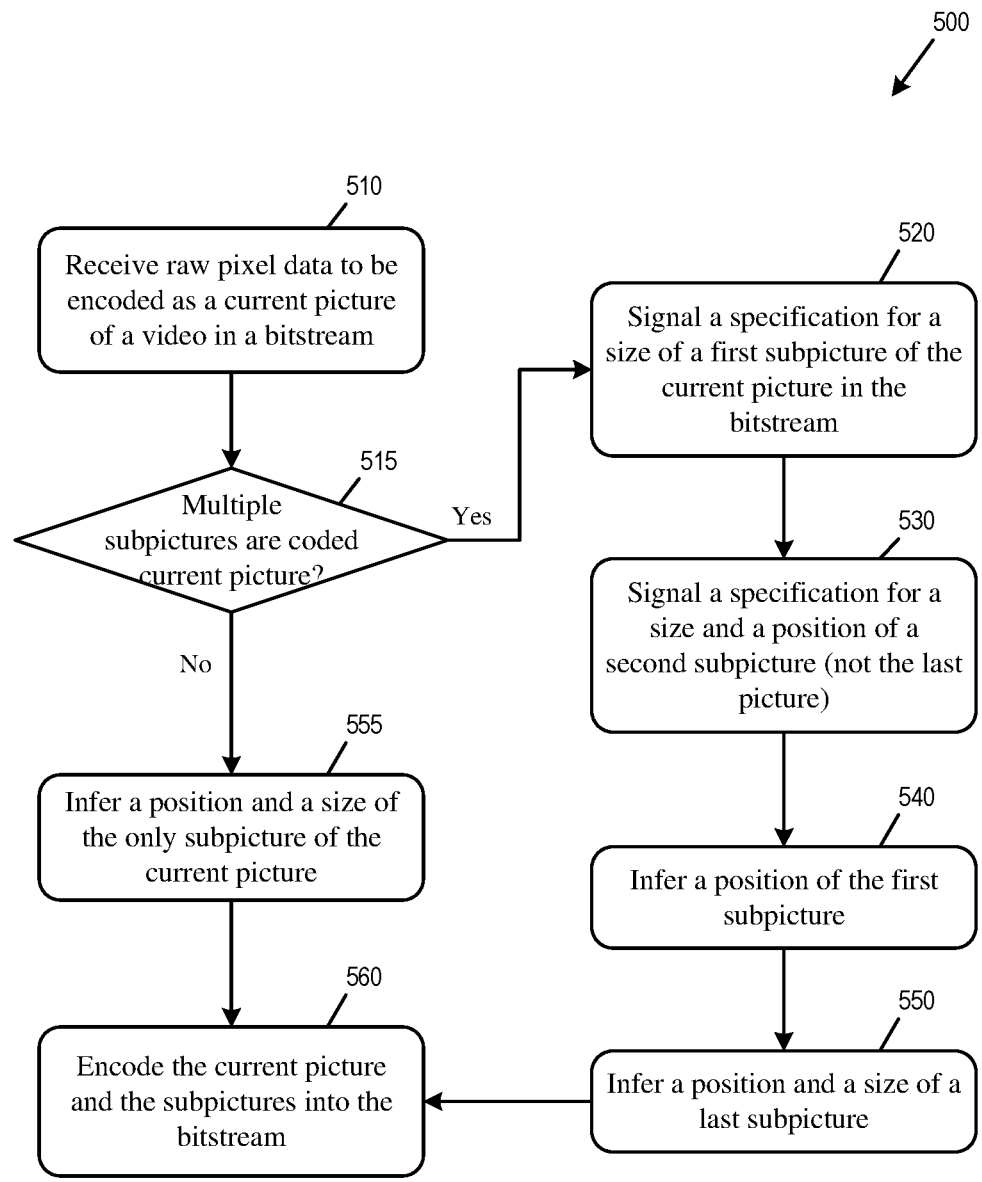
FIG. 5 conceptually illustrates a process for specifying subpicture layout, slice structure, and picture identification.

FIG. 5 conceptually illustrates a process 500 for specifying subpicture layout, slice structure, and picture identification. In some embodiments, one or more processing units (e.g., a processor) of a computing device implements the encoder 300 performs the process 500 by executing instructions stored in a computer readable medium. In some embodiments, an electronic apparatus implementing the encoder 300 performs the process 500.

The encoder receives (at block 510) data from raw pixel data to be encoded as a current picture of a video in a bitstream. The encoder determines (at block 515) whether multiple subpicture are coded in the current picture. If so, the process proceeds to 520. If only one subpicture (or no subpicture) is coded in the current picture, the process proceeds to 555.

At block 520, the encoder signals a specification for a size of a first subpicture of the current picture in the bitstream. The position of the first subpicture, the position and the size of a last subpicture of the current picture are not specified in the bitstream. In some embodiments, the encoder signals the positions and the sizes of the multiple subpictures in the bitstream, while the position of the first subpicture and the size of the last subpicture are taken as inferred values during the signaling.

The encoder may signal (at block 530) a specification for the size and the position of a second subpicture (that is not the last picture). The encoder infers (a block 540) the position of the first subpicture. The encoder also infers (a block 550) the position and the size of the last subpicture. The process then proceeds to block 560.

At block 555, the encoder infers a position and a size of the only subpicture of the current picture. The position and the size of the only subpicture in the current picture are not specified in the bitstream. The encoder then proceeds to 560. The encoder encodes (at 560) the current picture and the subpictures into the bitstream. The subpictures are encoded according to the specified and/or the inferred positions and sizes of the subpictures.

In some embodiments, the encoder also signals a picture order count of the current picture in a picture header of the current picture into the bitstream. In some embodiments, the picture order count is signaled in the bitstream when the picture header for the current picture is repeated in the bitstream (e.g., when ph_repetition_resent_flag is present to indicate that the picture header is being repeated). The picture order count in these instances can be used as an identifier that associates the repeated picture headers with the current picture. In some embodiments, the picture order count of the current picture is also signaled in slice headers of the current picture, and the picture order count signaled in the slice headers has a same value as the picture order count signaled in the picture header.

In some embodiments, when the current picture is allowed to be partitioned into multiple raster scan slices (or non-rectangular slices) (e.g., raster scan_slice_in_pic_enabled flag), the encoder specifies in the bitstream whether multiple slices are coded in the current picture (e.g., slices_pic_present_flag). In some embodiments, when the current picture is partitioned into multiple raster scan slices and multiple slices are coded in the current picture, the encoder specifies a number of CTUs in a slice (e.g., num_ctus_in_slice_minus1) in a slice header.

In some embodiments, when the current picture is partitioned into non-rectangular slices (or raster scan slices) (e.g., rect_slice_flag=0), the encoder specifies whether multiple slices are coded in a tile in the bitstream (e.g., slices_in_tile_present_flag). In some embodiments, when the current picture is partitioned into non-rectangular slices and when multiple slices are coded in a tile, the encoder specifies a number of CTUs in a slice (e.g., num_ctus_in_slice_minus1) in the bitstream.

V. Example Video Decoder

Figure 6:
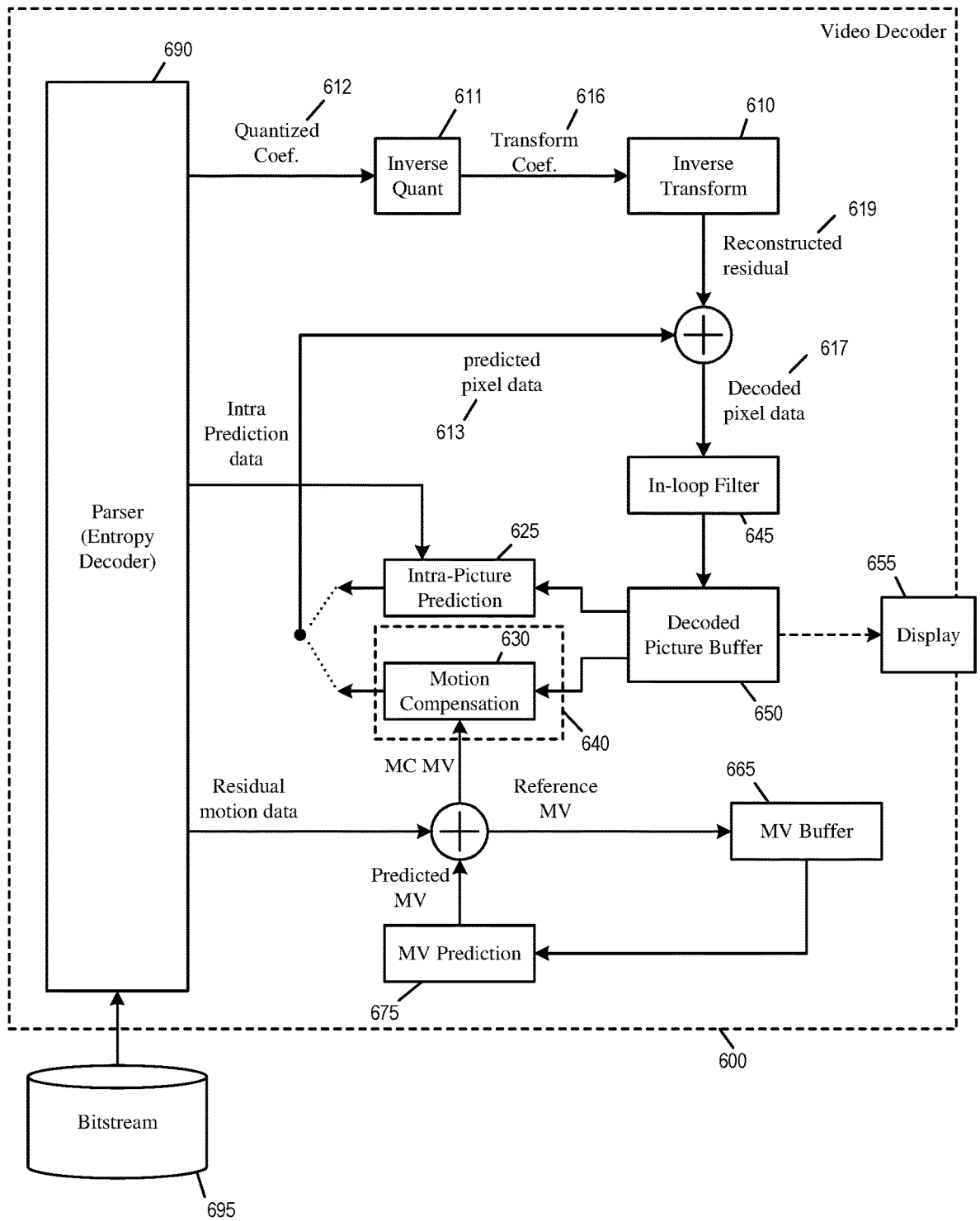
FIG. 6 illustrates an example video decoder.

FIG. 6 illustrates an example video decoder 600 that receives and applies specification of subpicture layout, slice structure, and picture identification. As illustrated, the video decoder 600 is an image-decoding or video-decoding circuit that receives a bitstream 695 and decodes the content of the bitstream into pixel data of video frames for display. The video decoder 600 has several components or modules for decoding the bitstream 695, including some components selected from an inverse quantization module 611, an inverse transform module 610, an intra-prediction module 625, a motion compensation module 630, an in-loop filter 645, a decoded picture buffer 650, a MV buffer 665, a MV prediction module 675, and a parser 690. The motion compensation module 630 is part of an inter-prediction module 640.

In some embodiments, the modules 610-690 are modules of software instructions being executed by one or more processing units (e.g., a processor) of a computing device. In some embodiments, the modules 610-690 are modules of hardware circuits implemented by one or more ICs of an electronic apparatus. Though the modules 610-690 are illustrated as being separate modules, some of the modules can be combined into a single module.

The parser 690 (or entropy decoder) receives the bitstream 695 and performs initial parsing according to the syntax defined by a video-coding or image-coding standard. The parsed syntax element includes various header elements, flags, as well as quantized data (or quantized coefficients) 612. The parser 690 parses out the various syntax elements by using entropy-coding techniques such as context-adaptive binary arithmetic coding (CABAC) or Huffman encoding.

The inverse quantization module 611 de-quantizes the quantized data (or quantized coefficients) 612 to obtain transform coefficients, and the inverse transform module 610 performs inverse transform on the transform coefficients 616 to produce reconstructed residual signal 619. The reconstructed residual signal 619 is added with predicted pixel data 613 from the intra-prediction module 625 or the motion compensation module 630 to produce decoded pixel data 617. The decoded pixels data are filtered by the in-loop filter 645 and stored in the decoded picture buffer 650. In some embodiments, the decoded picture buffer 650 is a storage external to the video decoder 600. In some embodiments, the decoded picture buffer 650 is a storage internal to the video decoder 600.

The intra-prediction module 625 receives intra-prediction data from bitstream 695 and according to which, produces the predicted pixel data 613 from the decoded pixel data 617 stored in the decoded picture buffer 650. In some embodiments, the decoded pixel data 617 is also stored in a line buffer (not illustrated) for intra-picture prediction and spatial MV prediction.

In some embodiments, the content of the decoded picture buffer 650 is used for display. A display device 655 either retrieves the content of the decoded picture buffer 650 for display directly, or retrieves the content of the decoded picture buffer to a display buffer. In some embodiments, the display device receives pixel values from the decoded picture buffer 650 through a pixel transport.

The motion compensation module 630 produces predicted pixel data 613 from the decoded pixel data 617 stored in the decoded picture buffer 650 according to motion compensation MVs (MC MVs). These motion compensation MVs are decoded by adding the residual motion data received from the bitstream 695 with predicted MVs received from the MV prediction module 675.

The MV prediction module 675 generates the predicted MVs based on reference MVs that were generated for decoding previous video frames, e.g., the motion compensation MVs that were used to perform motion compensation. The MV prediction module 675 retrieves the reference MVs of previous video frames from the MV buffer 665. The video decoder 600 stores the motion compensation MVs generated for decoding the current video frame in the MV buffer 665 as reference MVs for producing predicted MVs.

The in-loop filter 645 performs filtering or smoothing operations on the decoded pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
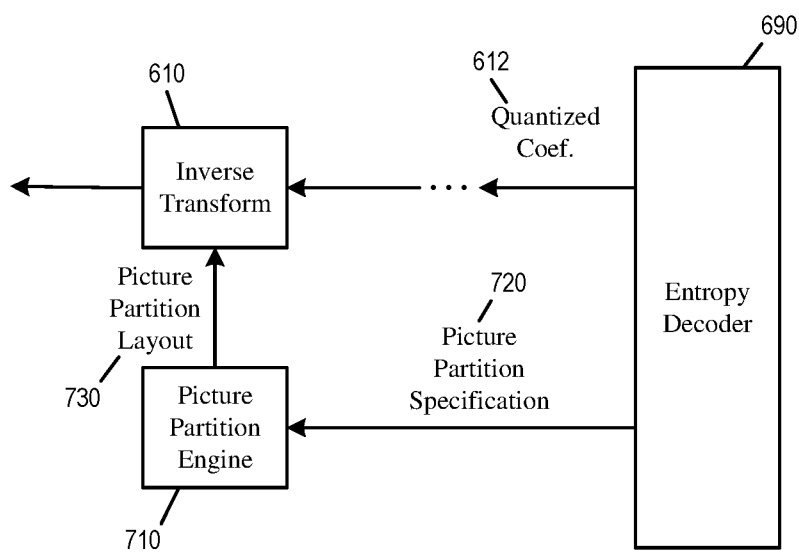
FIG. 7 illustrates portions of the video decoder that receives and applies specifications of subpicture layout, slice structure, and picture identification.

FIG. 7 illustrates portions of the video decoder 600 that receives and applies specifications of subpicture layout, slice structure, and picture identification. Specifically, the entropy decoder 690 parses the bitstream 695 for syntax elements related to picture partitioning, including flags or parameters such as positions and sizes of subpictures, slice-in-tile or slice-in-picture indications, raster scan slice or rectangular slice indications in SPSs, PPSs, or slice headers of the bitstream 695. The entropy decoder 690 also parses picture order counts and picture header repeat indications in picture headers. Based on the parsed syntax elements, the entropy decoder 690 generates a set of picture partitioning information 720 for a picture partition engine 710. The picture partition engine 710 provides corresponding picture partitioning layout 730 to the inverse transform module 610, Intra-picture prediction module 625, inter-prediction module 640, etc., so these modules may reconstruct the current picture according to the subpicture, tile, and slice layout.

Figure 8:
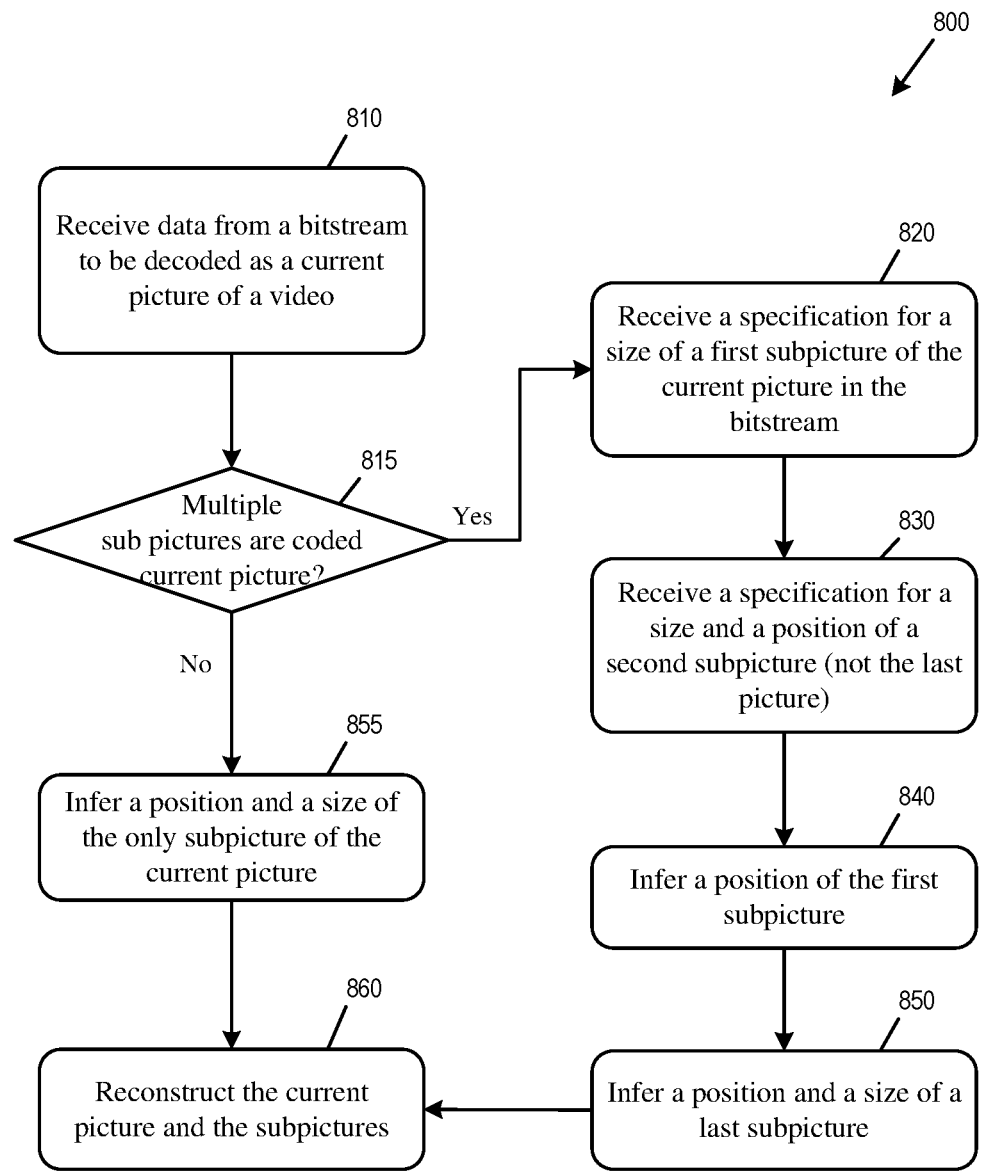
FIG. 8 conceptually illustrates a process for receiving specifications of subpicture layout, slice structure, and picture identification.

FIG. 8 conceptually illustrates a process 800 for receiving specifications of subpicture layout, slice structure, and picture identification. In some embodiments, one or more processing units (e.g., a processor) of a computing device implements the decoder 600 performs the process 800 by executing instructions stored in a computer readable medium. In some embodiments, an electronic apparatus implementing the decoder 600 performs the process 800.

The decoder receives (at block 810) data from a bitstream to be decoded as a current picture of a video. The decoder determines (at block 815) whether multiple subpicture are coded in the current picture. If so, the process proceeds to 820. If only one subpicture (or no subpicture) is coded in the current picture, the process proceeds to 855.

At block 820, the decoder receives a specification for a size of a first subpicture of the current picture in the bitstream. The position of the first subpicture, the position and the size of a last subpicture of the current picture are not specified in the bitstream. In some embodiments, the decoder parses the bitstream for the positions and the sizes of the multiple subpictures, and the position of the first subpicture and the size of the last subpicture are skipped during the parsing.

The decoder may receive (at block 830) a specification for the size and the position of a second subpicture (that is not the last picture). The decoder infers (a block 840) the position of the first subpicture. The decoder also infers (a block 850) the position and the size of the last subpicture. The process then proceeds to block 860.

At block 855, the decoder infers a position and a size of the only subpicture of the current picture. The position and the size of the only subpicture in the current picture are not specified in the bitstream. The decoder then proceeds to 860. The decoder reconstructs (at 860) the current picture and the subpictures. The subpictures are reconstructed according to the specified and/or the inferred positions and sizes of the subpictures.

In some embodiments, the decoder also receives a picture order count of the current picture in a picture header of the current picture from the bitstream. In some embodiments, the picture order count is signaled in the bitstream when the picture header for the current picture is repeated in the bitstream (e.g., when ph_repetition_resent_flag is present to indicate that the picture header is being repeated). The picture order count in these instances can be used as an identifier that associates the repeated picture headers with the current picture. In some embodiments, the picture order count of the current picture is also signaled in slice headers of the current picture, and the picture order count signaled in the slice headers has a same value as the picture order count signaled in the picture header.

In some embodiments, when the current picture is allowed to be partitioned into multiple raster scan slices (or non-rectangular slices) (e.g., raster scan_slice_in_pic_enabled flag), the decoder receives from the bitstream an indication whether multiple slices are coded in the current picture (e.g., slices_pic_present_flag). In some embodiments, when the current picture is partitioned into multiple raster scan slices and multiple slices are coded in the current picture, the decoder receives a specification of a number of CTUs in a slice from the bitstream (e.g., num_ctus_in_slice_minus1) in a slice header.

In some embodiments, when the current picture is partitioned into non-rectangular slices (or raster scan slices) (e.g., rect_slice_flag=0), the decoder receives a specification of whether multiple slices are coded in a tile from the bitstream (e.g., slices_in_tile_present_flag). In some embodiments, when the current picture is partitioned into non-rectangular slices and when multiple slices are coded in a tile, the decoder receives a specification of a number of CTUs in a slice (e.g., num_ctus_in_slice_minus1) from the bitstream.

In some embodiments, an encoder may signal (or generate) one or more syntax element in a bitstream, such that a decoder may parse said one or more syntax element from the bitstream.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 9:
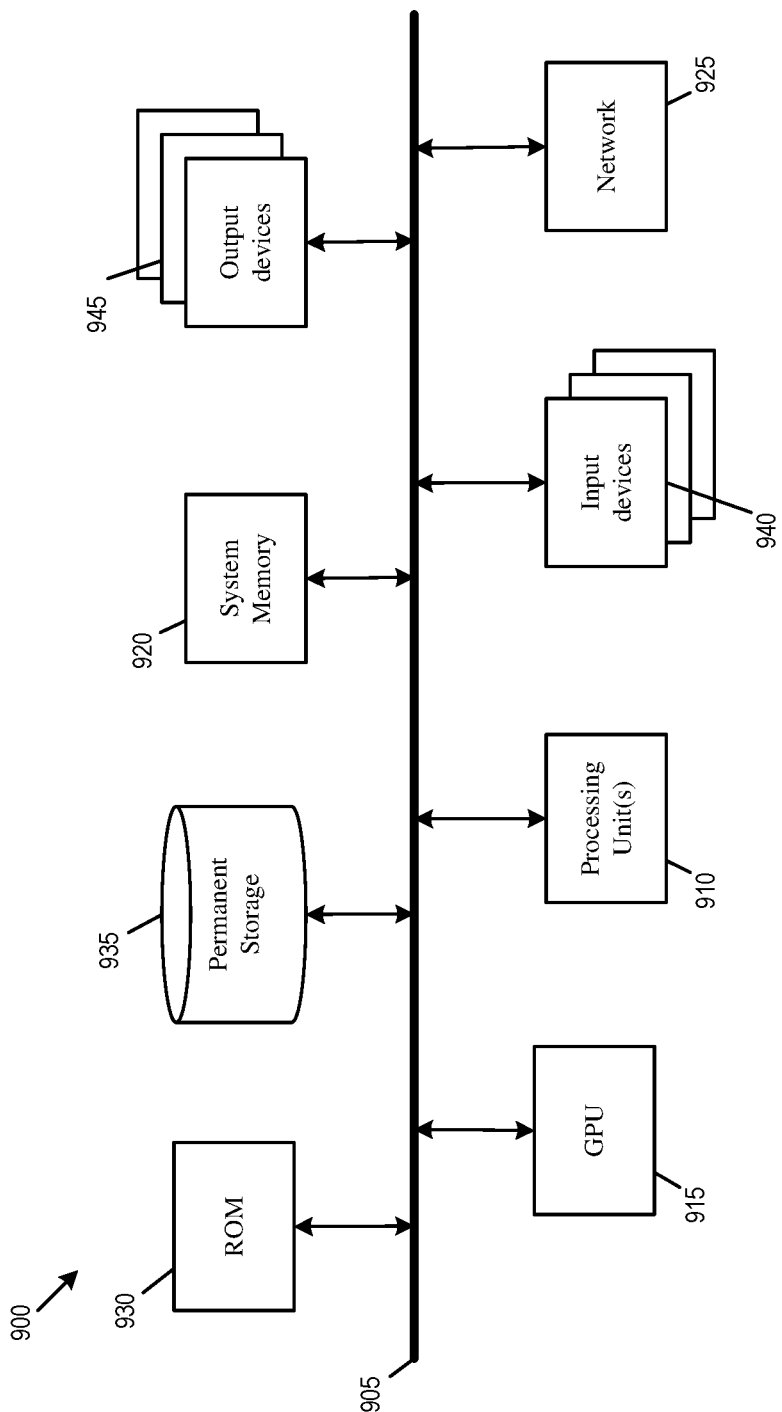
FIG. 9 conceptually illustrates an electronic system with which some embodiments of the present disclosure are implemented.

FIG. 9 conceptually illustrates an electronic system 900 with which some embodiments of the present disclosure are implemented. The electronic system 900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 900 includes a bus 905, processing unit(s) 910, a graphics-processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the GPU 915, the read-only memory 930, the system memory 920, and the permanent storage device 935.

From these various memory units, the processing unit(s) 910 retrieves instructions to execute and data to process in order to execute the processes of the present disclosure. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are used by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the present disclosure use a mass-storage device (such as a magnetic or optical disk and its corresponding disk drive) as the permanent storage device 935.

Other embodiments use a removable storage device (such as a floppy disk, flash memory device, etc., and its corresponding disk drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor uses at runtime. In some embodiments, processes in accordance with the present disclosure are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 5 and FIG. 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an", e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream to be decoded as a current picture of a video;
parsing the bitstream for positions and sizes of a plurality of subpictures, wherein a position of a first subpicture and a size of a last subpicture are skipped during the parsing, the position of the first subpicture indicating a pixel location in the current picture, the size of the last subpicture indicating a width or height of the last subpicture; and reconstructing the current picture and the plurality of subpictures of the current picture according to the positions and sizes of the plurality of subpictures.

2. The video decoding method of claim 1, wherein a size and a position of a second subpicture of the current picture are parsed from the bitstream.

3. The video decoding method of claim 1, further comprising:

determining the position of the first subpicture, the position and the size of the last subpicture of the current picture.

4. The video decoding method of claim 1, further comprising:

when there is only one subpicture coded in the current picture, determining a position and a size of the subpicture of the current picture, wherein neither the position nor the size of the subpicture in the current picture is parsed from the bitstream.

5. The video decoding method of claim 1, further comprising:

receiving a picture order count of the current picture from a picture header of the current picture from the bitstream.

6. The video decoding method of claim 5, wherein a picture order count is signaled in one or more slice headers of the current picture, wherein the picture order count signaled in the one or more slice header has a same value as the picture order count signaled in the picture header.

7. The video decoding method of claim 5, wherein the picture order count is signaled in the bitstream when the picture header for the current picture is repeated in the bitstream.

8. The video decoding method of claim 1, further comprising:

when the current picture is partitioned into multiple non-tile based raster scan slices, receiving a specification of whether multiple slices are coded in the current picture.

9. The video decoding method of claim 1, further comprising:

when the current picture is partitioned into multiple non-tile based raster scan slices and multiple slices are coded in the current picture, receiving a specification of a number of coding tree units (CTUs) in a slice from the bitstream.

10. The video decoding method of claim 1, further comprising:

when the current picture is partitioned into non-rectangular slices receiving a specification of whether multiple slices are coded in a tile from the bitstream.

11. The video decoding method of claim 1, further comprising:

when the current picture is partitioned into non-rectangular slices and when multiple slices are coded in a tile, receiving a specification of a number of coding tree units (CTUs) in a slice from the bitstream.

12. A video coding method, comprising:

receiving data for a block of pixels to be encoded or decoded as a current block of a current picture of a video;

receiving a picture order count of the current picture, wherein the picture order count is directly signaled in a picture header of the current picture, and wherein the receiving of the picture order count comprises receiving the picture header; and encoding or decoding the current picture based on the picture order count, wherein the picture order count is further signaled in each slice header of the slices in the current picture, and wherein the picture order count signaled in each slice header has a same value as the picture order count signaled in the picture header.

13. The video coding method of claim 12, wherein the picture header stores parameters that are unique to the current picture and common to different slices of the current picture.

14. The video coding method of claim 12, further comprising:

when the picture header for the current picture is being repeated in a bitstream, signaling in the picture header or parsing from the picture header the picture order count of the current picture.

15. An electronic apparatus, comprising:

a video encoder circuit configured to perform operations comprising:

receiving data from raw pixel data to be encoded as a current picture of a video in a bitstream;

signaling positions and sizes of a plurality of subpictures in the bitstream, wherein a position of a first subpicture and a size of a last subpicture are skipped during the signaling, the position of the first subpicture indicating a pixel location in the current picture, the size of the last subpicture indicating a width or height of the last subpicture; and encoding the current picture and the subpictures of the current picture according to the positions and sizes of the plurality of subpictures.

16. The electronic apparatus of claim 15, wherein when there is only one subpicture, a position and a size of the subpicture are skipped during the signaling.

* * * * *